(12) United States Patent
Fagot-Revurat

(10) Patent No.: US 7,562,567 B2
(45) Date of Patent: Jul. 21, 2009

(54) VEHICLE GROUND CONTACT ELEMENT, TIRE AND VEHICLE GROUND CONTACT

(75) Inventor: Lionel Fagot-Revurat, Ussel de Vensat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/792,017

(22) PCT Filed: Dec. 2, 2005

(86) PCT No.: PCT/EP2005/056412

§ 371 (c)(1), (2), (4) Date: May 29, 2007

(87) PCT Pub. No.: WO2006/058917

PCT Pub. Date: Jun. 8, 2006

(65) Prior Publication Data

US 2008/0122707 A1     May 29, 2008

(30) Foreign Application Priority Data

Dec. 2, 2004    (FR) ................................. 04 12828

(51) Int. Cl.
      *B60C 23/02*      (2006.01)

(52) U.S. Cl. .................. 73/146.5; 340/442; 343/711
(58) Field of Classification Search ................ 73/146.5, 73/146.8; 340/442; 342/42; 343/853
See application file for complete search history.

(56) References Cited

U.S. PATENT DOCUMENTS

| | | | |
|---|---|---|---|
| 5,923,303 A * | 7/1999 | Schwengler et al. | 343/853 |
| 2002/0121132 A1 | 9/2002 | Breed et al. | |
| 2003/0142004 A1* | 7/2003 | Gottwald et al. | 342/42 |
| 2007/0295072 A1* | 12/2007 | Fagot-Revurat et al. | 73/146 |
| 2008/0089385 A1* | 4/2008 | Fagot-Revurat et al. | 374/117 |

FOREIGN PATENT DOCUMENTS

WO    WO 2004/074016 A    9/2004

* cited by examiner

*Primary Examiner*—Andre J Allen
(74) *Attorney, Agent, or Firm*—Cohen Pontani Lieberman & Pavane LLP

(57) ABSTRACT

A ground-contacting component of a vehicle, comprising at least two physical parameter measurement systems, each measurement system having a linearly polarized antenna. The polarization directions of the antennas make an angle of between 30 and 90° between them. Also disclosed are a tire and a vehicle ground contact.

19 Claims, 3 Drawing Sheets

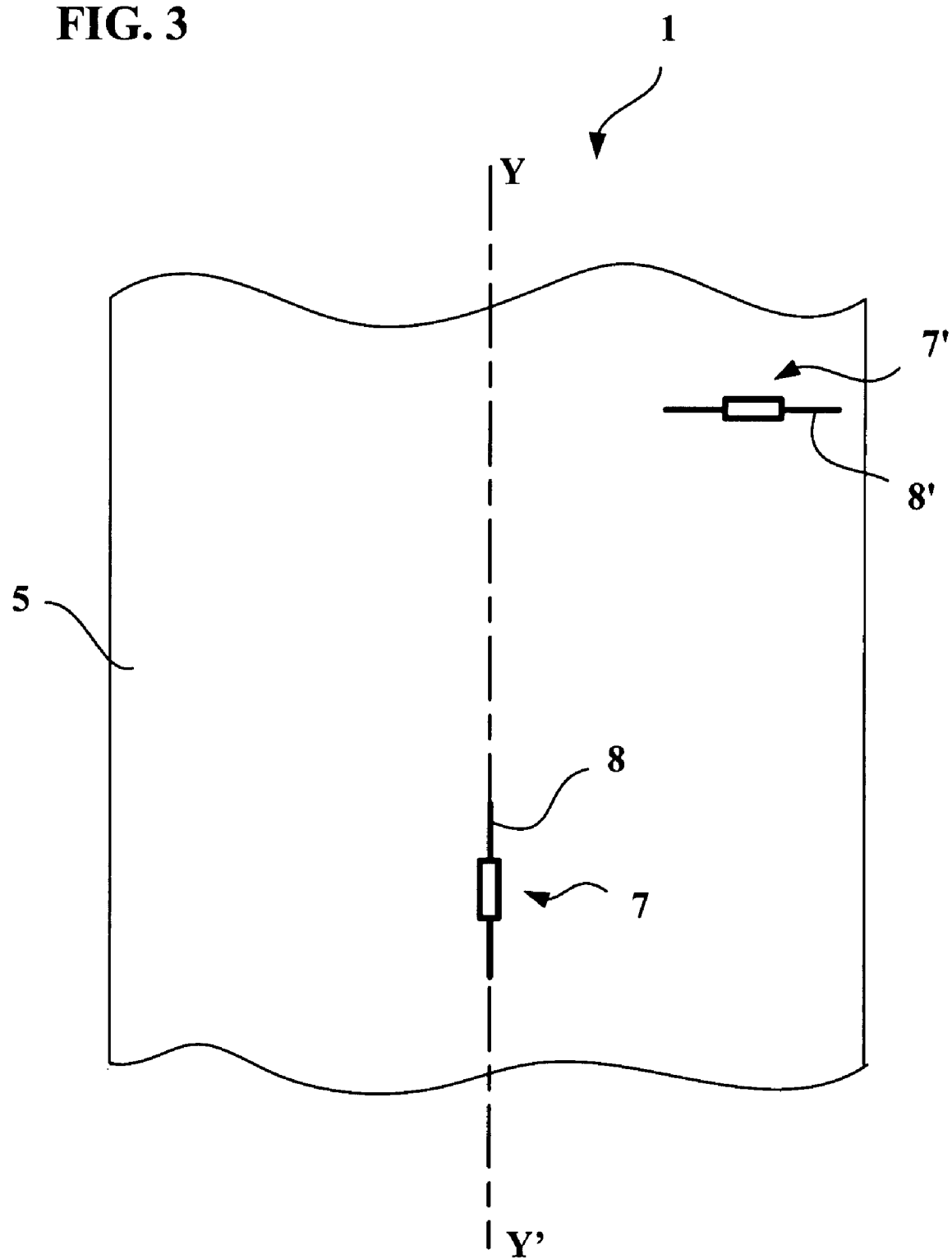

VEHICLE GROUND CONTACT ELEMENT, TIRE AND VEHICLE GROUND CONTACT

RELATED APPLICATION

This is a U.S. National Phase Application under 35USC 371 of International Application PCT/EP2005/056412, filed on Dec. 2, 2005.

FIELD OF THE INVENTION

The present invention relates to a ground-contacting component of a vehicle, comprising at least two physical parameter measurement systems in order to communicate with an interrogation device, for example placed on the vehicle.

The invention more specifically relates to a tire and also relates to a vehicle ground contact.

The invention relates to ground-contacting components of any type of vehicle, such as an automobile, a motorcycle, a heavy-goods vehicle, an agricultural machine or civil engineering machine.

BACKGROUND OF THE INVENTION

Although not limited to such an application, the invention will be described more particularly with reference to a tire.

The reinforcement armature or reinforcement of tires is, at the present time—and usually—formed by a stack of one or more plies conventionally denoted by "carcass plies", "crown plies", etc. This way of denoting the reinforcements derives from the manufacturing process, which consists in producing a series of semifinished products in the form of plies, provided with filamentary reinforcing elements that are often longitudinal, which reinforcements are subsequently assembled or stacked so as to build up a tire blank. The plies are produced flat, with large dimensions, and are subsequently cut according to the dimensions of a given product. The plies are also assembled, firstly, substantially flat. The blank thus produced undergoes a forming operation so as to adopt the typical toroidal profile of tires. Semifinished products called "finishing products" are then applied to the blank, in order to obtain a product ready for vulcanization.

Such a "conventional" process involves, in particular as regards the phase of producing the tire blank, the use of an anchoring element (generally a bead wire), used for anchoring or retaining the carcass reinforcement in the region of the tire beads. Thus, for this type of process, a portion of all of the plies making up the carcass reinforcement (or only part of it) is upturned around a bead wire placed in the bead of the tire. In this way, the carcass reinforcement is anchored in the bead.

Generalization in the industry using this type of conventional process, despite many variants in the way in which the plies are produced and assembled, has led those skilled in the art to use a vocabulary derived from the process: hence the generally accepted terminology comprising in particular the terms "plies", "carcass", "bead wire", "forming", for denoting the passage from a flat profile to a toroidal profile, etc.

At the present time there are tires that do not comprise, strictly speaking, "plies" or "bead wires" according to the above definitions. For example, document EP 0 582 196 discloses tires produced without using semifinished products in the form of plies. For example, the reinforcing elements for the various reinforcement structures are applied directly to the adjacent layers of rubber compounds, the combination being applied by successive layers on a toroidal core, the shape of which makes it possible to obtain, directly, a profile matching the final profile of the tire being manufactured. Thus, in this case, there are no longer "semifinished products", nor "plies" nor a "bead wire". The base products, such as the rubber compounds and the reinforcing elements in the form of cords or filaments, are applied directly to the core. Since this core has a toroidal shape, there is no longer a forming operation for bringing the blank from a flat profile to a toroidal profile.

Moreover, the tires described in that document do not have a "conventional" upturn of the carcass ply around a bead wire. This type of anchoring is replaced with an arrangement in which circumferential cords are placed adjacent said sidewall reinforcement structure, the combination being embedded in an anchoring or bonding rubber compound.

There are also processes for assembly on a toroidal core using semifinished products suitable for rapid, effective and simple application on a central core. Finally, it is also possible to use a hybrid construction, comprising both certain semifinished products for achieving certain architectural aspects (such as plies, bead wires, etc.), whereas others are produced by directly applying reinforcing elements and/or compounds.

In the present document, so as to take into account recent technological developments both in the manufacturing field and in product design, the conventional terms such as "plies", "bead wires", etc. are advantageously replaced with neutral terms or terms that are independent of the type of process used. Thus, the term "carcass reinforcement" or "sidewall reinforcement" is valid for denoting the reinforcing elements of a carcass ply in the conventional process, and the corresponding reinforcing elements, generally applied in the sidewalls, of a tire produced using a process without semifinished products. For its part, the term "anchoring region" may denote both the "conventional" carcass ply upturn around a bead wire of a conventional process and the assembly formed by the circumferential reinforcing elements, the rubber compound and the adjacent sidewall reinforcement portions of a base region produced using a process with application on a toroidal core.

The longitudinal direction, or circumferential direction, of the tire is the direction corresponding to the periphery of the tire and is defined by the run direction of the tire.

A circumferential plane or circumferential sectional plane is a plane perpendicular to the rotation axis of the tire. The equatorial plane is the circumferential plane passing through the center or top of the tread.

The transverse or axial direction of the tire is parallel to the rotation axis of the tire.

A radial plane contains the rotation axis of the tire.

The performance of a tire, especially as regards grip, endurance, wear resistance and running comfort, is dependent on various components of the tire such as the choice of crown architecture and the choice and nature of the rubber compounds constituting the various parts of the tire. For example, the nature of the rubber compounds constituting the tread have an impact on the properties of said tire, such as the wear and grip properties.

Moreover, it is also known to those skilled in the art that the physico-chemical properties of rubber compounds vary with the use to which the tire is put and especially as a function of temperature, which for example has an influence on the properties of the tread of a tire. Thus, when a vehicle is being used, the rubber compounds forming the various parts of the tire, such as the base regions, the sidewalls and the tread, are subjected to stresses which result in the compounds rising in temperature and therefore in variations in the physico-chemical properties of said compounds. It is known, for example, that, depending on the type of tire and its use, certain regions of the tire are subjected to stresses such that the temperatures reached may result in non-optimal performance of the tire, in terms of grip or wear.

It is thus desirable to be able to measure a temperature or else another physical parameter of the tire and especially of the rubber compounds of which it is made, especially so as to help the driver or rider of the vehicle to adapt his operation to the conditions and thus optimize the performance of the tire.

It is known, for example from document EP 1 275 949, to implant a wireless sensor in tires so as to determine forces or stresses exerted within the tire.

Document EP 0 937 615 discloses the use of wireless surface acoustic wave sensors incorporated into a tire, especially for measuring the grip of a tire. Such a sensor has the advantage of being able to be remotely interrogated wirelessly, by radio waves, without a nearby energy source being necessary. The energy of the interrogating radio wave sent by a remote interrogation device is sufficient for the sensor to transmit a modified radio wave in response.

Wireless SAW (surface acoustic wave) or BAW (bulk acoustic wave) sensors may thus be used in tires to measure physical parameters. One important advantage is that they can be remotely interrogated by radio waves, without a nearby energy source being necessary.

However, in the case of SAW or BAW sensors of the resonator type, unlike SAW or BAW sensors of the delay line type, whenever at least two measurement devices of this type, using the same frequency band, are inserted into a tire, an associated interrogation device is not capable of identifying the source of the signals that it receives, and therefore of identifying the sensor with which it communicates. This is because the use of several SAW or BAW sensors of the resonator type does not allow signals to be transmitted by each of them that permit their identification when they work within the same frequency band.

SUMMARY OF THE INVENTION

One object of the invention is thus to provide a ground-contacting component of a vehicle, such as a tire, capable of communicating with an interrogation device attached to the vehicle, said element comprising at least two physical parameter measurement systems, said systems not being able to be identified by the signal that they transmit.

This object has been achieved according to the invention by a ground-contacting component of a vehicle, comprising at least two physical parameter measurement systems, each measurement system having a linearly polarized antenna, the polarization directions of the antennas making an angle of between 30 and 90° between them.

According to a preferred embodiment of the invention, when the ground-contacting component consists at least partly of a polymeric compound, at least one measurement system is embedded in a polymeric compound. A preferred variant of the invention relates to at least two systems embedded in at least one polymeric compound.

Other embodiments according to the invention relate to ground-contacting components of a vehicle to which the sensors are associated, these being for example sensors fastened into the cavity of a tire.

According to a preferred embodiment of the invention, the systems are wireless measurement systems based on surface acoustic wave or bulk acoustic wave technology.

The invention is particularly advantageous when the measurement systems are identical. This makes it possible in fact to select the sensor with which the communication must be established when, for example, two sensors are embedded in different polymeric compounds of the component.

It has been demonstrated during trials, in particular in the case in which two SAW or BAW sensors of the resonator type are present in a ground-contacting component of a vehicle, that the choice of orientation of the polarization direction of the antennas of one relative to the other does in fact permit one or other of the sensors to be selected on the basis of signals exchanged with an interrogation device suitable for these two orientations. Advantageously, the interrogation device is designed to interrogate the sensors one after another.

By placing at least two sensors in a component, it will therefore be possible for example to take measurements of the same parameter at different points in the component.

SAW and BAW sensors also have the advantage of permitting frequent high-speed measurements and thus ensure information is provided frequently and rapidly about the state of a component. For example, in the case of a tire into which such a sensor is inserted, the latter may be interrogated frequently provided that the electromagnetic coupling between the sensor and the interrogation device associated with the vehicle is regularly established. The invention therefore has the advantage, when at least two sensors lie in the same longitudinal plane, of increasing the probability of obtaining coupling between a sensor and the interrogation device while furthermore having the advantage of being able to identify the origin of the signal received. In an alternative embodiment, not allowing rapid interrogation of one and the same sensor, increasing the number of sensors permits the measurement frequency to be increased. Such an embodiment is particularly advantageous in the case of emergency braking, the tire being equipped, as above, with at least two sensors in one and the same longitudinal plane.

According to a first embodiment of the invention, the component, which is a constituent of a mounted assembly comprising a wheel and a tire, is a part of the wheel.

According to a second embodiment of the invention, the component, which is a constituent of a mounted assembly comprising a wheel and a tire, is a part of the tire. At least one sensor is then advantageously inserted into a rubber compound constituting the tire. Depending on the use of this tire, or more precisely the vehicle for which it is intended, the component will be embedded in a rubber mass of the tread, of a sidewall or base region.

According to a third embodiment of the invention, the component, which is a constituent of a mounted assembly comprising a wheel, a tire and a support member for supporting the tire in particular for use in degraded mode, is a part of the support member.

Such a support member is for example a bearing surface on which the tire rests in the event of loss of pressure; such a bearing surface is, for example, described in document EP 0 314 988. It may also be a foam core, such as the product sold under the trademark "Bib Mousse" by Michelin. Such a component fills the cavity of the mounted assembly. It is used in particular for rallying competition vehicles. Knowing the temperature in predetermined regions of these components may provide information either about the state of the mounted assembly or about the state of the component itself.

Whatever the type of ground-contacting component in question, the measured parameter information is exchanged by radio waves with at least one interrogation device, for example one fastened to the vehicle, in order to provide the driver of the vehicle with this information. This information available to the driver allows him to adapt the way he is driving the vehicle so as to maintain optimal performance.

The invention also provides a tire comprising at least one carcass reinforcement structure formed from reinforcing elements and anchored on each side of the tire to a bead, the base of which is intended to be mounted on a rim seat, each bead being radially outwardly extended by a sidewall, the sidewalls radially outwardly joining a tread, the beads, the sidewalls and the tread consisting partly of rubber compounds, said tire comprising at least two physical parameter measurement systems, having linearly polarized antennas, the polarization directions of the antennas making an angle of between 30 and 90° between them.

According to one advantageous embodiment of the invention, the systems are embedded in at least one rubber compound.

According to a preferred embodiment of the invention, the systems are wireless measurement systems based on surface acoustic wave or bulk acoustic wave technology.

Also preferably, the measurement systems are identical.

According to a first embodiment of the tire according to the invention, the measurement system is embedded in a part of the tread. Depending on the type of vehicle for which the tire is intended, various regions of the tread may be monitored. For example, in the case of a motorcycle, it may in particular be useful to take a temperature measurement on the crown of the tire, that is to say, in the equatorial plane of the tire. The reason for this is that the tread region may, for example, be highly stressed during traveling at high speeds in a straight line for a long time. In another example, which is that of heavy-goods vehicles, the measurement system may, for example, be embedded in a part of the axially outer ends of the tread, this region also being called the shoulder of the tire. A person skilled in the art knows in fact that the shoulders of a tire are subjected to stresses that may result in the rubber compounds overheating, which may substantially modify the performance of the tire.

In a second embodiment of the tire according to the invention, the measurement system is embedded in a part of a sidewall. Measuring the temperature in a region of the sidewall may in particular provide important information in the case of civil engineering vehicles exposed to large bending forces when running, which stress certain regions of the sidewalls.

In a third embodiment of the tire according to the invention, the measurement system is embedded in a part of a bead. Such an application may be particularly useful in the case of agricultural vehicles, in particular owing to the large bending forces to which these tires are subjected.

As indicated above, such an embodiment makes it possible to select the system communicating with an interrogation device, for example associated with the vehicle, when at least two physical parameter measurement systems incorporated in different rubber compound regions.

Such an embodiment of a tire according to the invention may be particularly beneficial in the case of a vehicle of the motorcycle type equipped with tires made with a high degree of curvature, usually greater than 0.2, being used with cambered wheels. The stresses exerted, for example in the equatorial plane of the tread and in the axially outer parts of the tread, are not the same, therefore, since they are under different conditions. This is because, depending on the use of the motorcycle, either running in a straight line or around a curve, the part of the tread in contact with the ground is not the same and is not stressed in the same way. Placing temperature sensors in the various corresponding regions, according to the invention, enables these various regions to be continuously monitored owing to the possibility of selecting the sensors.

To make it easier to install the physical parameter measurement system(s), the tire according to the invention is advantageously produced using a manufacturing technique of the type on a hard core or rigid former, as mentioned above.

Such a tire thus produced using a technique of the type on a hard or toroidal core, in particular permits the physical parameter measurement systems to be placed in a virtually final position, a shaping step not being required using this type of process, it being possible for said final position also to be completely identified. Indeed, the manufacture of the type on a hard core may allow a physical parameter measurement system to be inserted with predetermined indexation.

The invention also provides a vehicle ground contact, comprising at least two components, at least two components comprising at least one physical parameter measurement system, each measurement system having a linearly polarized antenna, the polarization directions of the antennas making an angle of between 30 and 90° between them.

According to a preferred embodiment of the invention, with at least one ground-contacting component consisting at least partly of a polymeric compound, at least one measurement system is embedded in the polymeric compound.

According to a preferred embodiment of the invention, the systems are wireless measurement systems based on surface acoustic wave or bulk acoustic wave technology.

Also preferably, the measurement systems are identical.

BRIEF DESCRIPTION OF THE DRAWINGS

Further details and advantageous features of the invention will become apparent from the following description of exemplary embodiments of the invention with reference to FIGS. 1 to 3, which show:

FIG. 3, a sketch in plan view of the tread of the tire of FIG. 1.

DETAILED DESCRIPTION OF THE DRAWINGS

Figure 1:
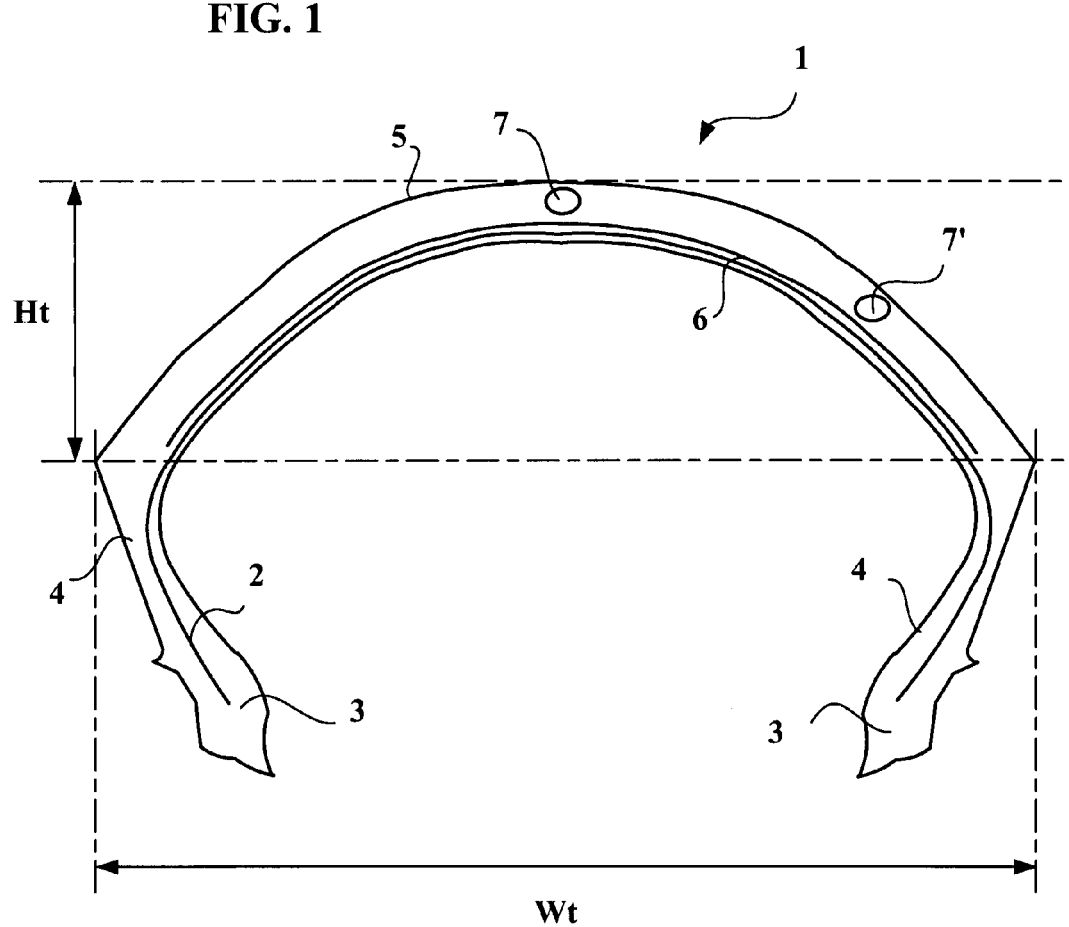
FIG. 1, a meridianal view of a diagram of a tire according to a first embodiment of the invention.
Figure 2:
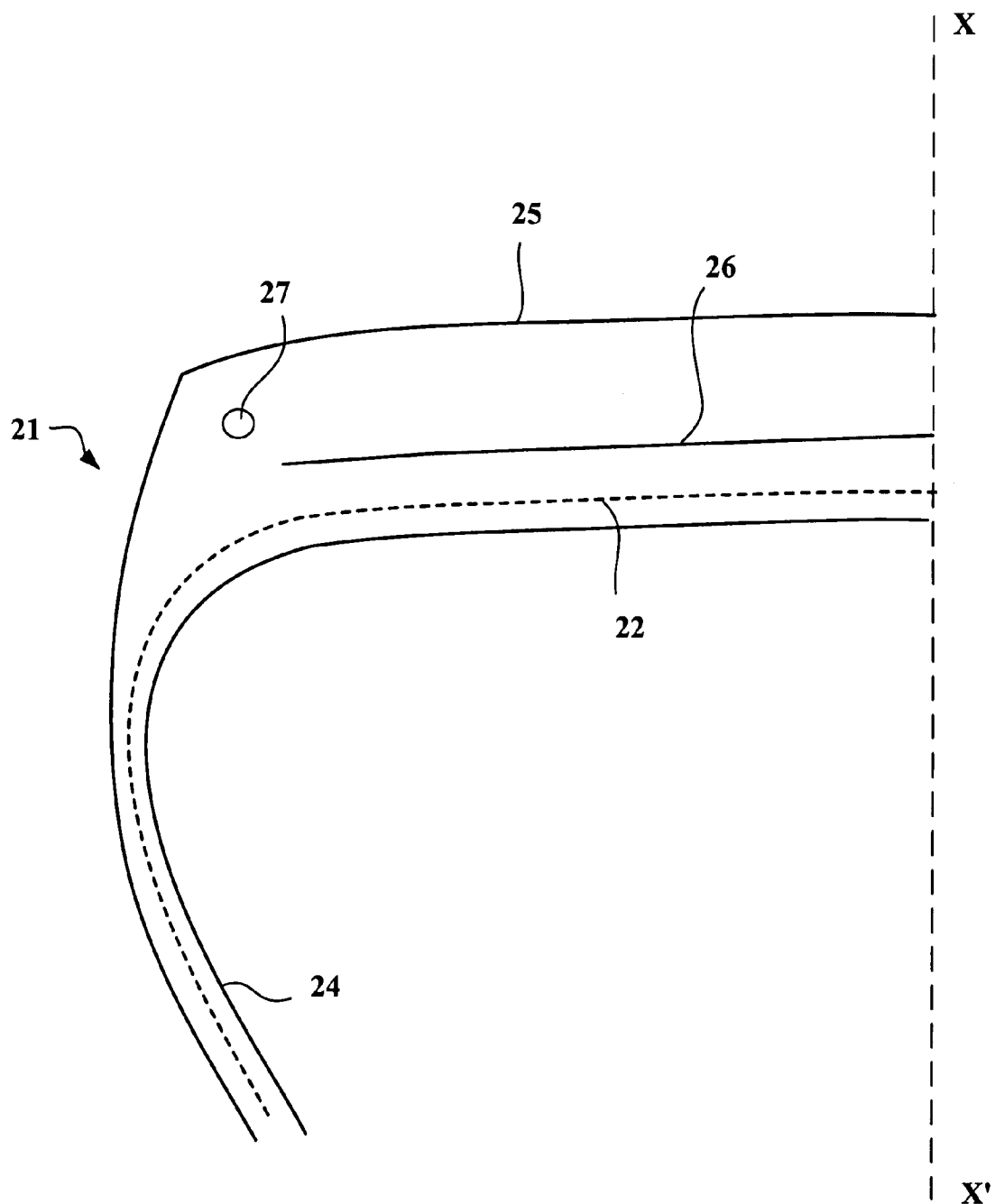
FIG. 2, a meridianal view of a diagram of a tire according to a second embodiment of the invention.

FIGS. 1 to 3 have not been drawn to scale so as to make them easier to understand.

FIG. 1 shows a tire 1 designed to be used on a vehicle of the motorcycle type, comprising a carcass reinforcement consisting of a single ply 2, comprising reinforcing elements of the textile type. The ply 2 consists of reinforcing elements positioned radially. The radial positioning of the reinforcing elements is defined by the lay angle of said reinforcing elements. A radial arrangement corresponds to a lay angle of said elements of between 65° and 90° to the longitudinal direction of the tire.

Said carcass ply 2 is anchored on each side of the tire 1 in a bead 3, the base of which is intended to be mounted on a rim seat. Each bead 3 is radially outwardly extended by a sidewall 4, said sidewall 4 radially outwardly joining a tread 5. The tire 1 thus formed has a curvature value of greater than 0.15 and preferably greater than 0.3. The curvature value is defined by the Ht/Wt ratio, that is to say the ratio of the height of the tread to the maximum width of the tread of the tire. The curvature value will advantageously be between 0.25 and 0.5 for a tire intended to be mounted at the front of a motorcycle and will advantageously be between 0.2 and 0.5 for a tire intended to be mounted at the rear.

The tire 1 also includes a crown reinforcement 6, the details of which have not been shown in FIG. 1. The crown reinforcement may comprise at least one ply of reinforcing elements that are mutually parallel and make acute angles to the circumferential direction and/or a ply of circumferential reinforcing elements. In the case of a tire comprising at least two plies of reinforcing elements making acute angles to the circumferential direction, said reinforcing elements are crossed from one ply to the next, making angles of between 40 and 100° between them.

According to the invention, the tire includes two measurement systems 7, 7' for measuring the internal temperature of the rubber compound of the tread 5. These two measurement systems 7, 7' are identical and are wireless temperature sensors of the SAW (surface acoustic wave) resonator type. This type of sensor has the advantage, as explained above, of not requiring an associated power supply. It measures the temperature of the rubber compound that surrounds it by modifying a wave that it receives and retransmits.

In the case of FIG. 1, the sensor 7 is placed in the equatorial plane of the tire and provides information about the local temperature of the rubber compound, that is to say the temperature of the rubber compound directly in contact with the sensor. By placing the sensor in this region, the rider of the motorcycle can monitor, or be informed about, the temperature of a region liable to undergo considerable temperature variations, especially when running at high speed in a straight line.

The second sensor 7' is placed in an axially outer part of the tread 5 of the tire 1 and provides information regarding the internal temperature of said axially outer part of the tread 5 that is in contact with the ground when the motorcycle is traveling along a curved path, the tire 1 then being cambered.

In the case of FIG. 1, the two sensors 7, 7' are placed in the same radial plane. It may be preferable in certain situations to incorporate the sensors in different radial planes so as to avoid any risk of interference.

The two SAW resonator sensors having linearly polarized antennas are placed so that the polarization directions of the antennas make an angle of 90° between them.

An interrogator device is advantageously provided on the vehicle for communicating with the sensors. Said interrogator device is designed to permit electromagnetic coupling with each of the sensors and is designed to select the sensor with which communication has to be established. The information thus received may therefore be communicated to the rider. To communicate with each of the sensors, the interrogation device may for example have different antennas that can be coupled with each of the sensors, the coupling being switched from one sensor to another for example by a switching system.

FIG. 2 illustrates a second embodiment of the invention more particularly designed for the case of a heavy goods vehicle. FIG. 2 shows only part of a half-tire 21, which extends symmetrically with respect to the axis XX' representing the circumferential mid-plane, or equatorial plane, of a tire. The bottom regions and beads of the tire 21 in particular have not been shown in this figure.

In this FIG. 2, the SAW sensors 27 are chosen to be embedded in regions of the tread rubber compound located at the axially external end of said tread, usually called the shoulders of the tire. This is because those skilled in the art know that this type of tire, especially when subjected to large loads, is forced to experience stresses which, under extreme conditions, may result in the temperature rising in these regions of the tread.

The sensor 27 and the second sensor, which is not shown in the figure but is positioned symmetrically with respect to the first one with respect to the axis XX', are of the SAW resonator type, having linearly polarized antennas, and are identical. According to the invention, they are placed so that the polarization directions of the antennas make an angle of 90° between them.

As in the case of FIG. 1, the interrogation device, not shown in FIG. 2, associated with the vehicle is designed to communicate with the two sensors, the polarization directions of the antennas of which make an angle of 90° between them.

FIG. 3 is a sketch in plan view of the tread 5 of the tire 1 of the FIG. 1 in which the two measurement sensors 7, 7' are embedded in rubber compounds of the tire.

The first temperature measurement sensor 7, of SAW type, is placed in the region of the equatorial plane YY' of the tire 1 and, as explained in the case of FIG. 1, provides information regarding the internal temperature of that part of the tread 5 in contact with the ground when the motorcycle follows a straight line.

The second temperature measurement sensor 7', of SAW type, is placed in an axially outer part of the tread 5 of the tire 1 and provides information as regards the internal temperature of said axially outer part of the tread 5 which is in contact with the ground when the motorcycle follows a curved path, the tire 1 then being used with cambered wheels.

The temperature-relative information measured in the tread by each of the SAW resonator sensors is transmitted to an interrogation device, for example one attached to the vehicle. As was already mentioned above, the signals retransmitted by the SAW resonator sensors do not allow the retransmitting sensor to be selected. According to the invention, the polarization directions of the antennas 8 and 8' of each of the sensors 7, 7' make between them an angle of approximately 90°. These different polarization directions of each of the antennas require there to be complex transmit/receive systems within the interrogation device provided on the vehicle for communicating with each of the SAW resonator sensors implanted in the tire. This is because communication with the sensors can be provided only by satisfactory electromagnetic coupling between each of the sensors and a suitable interrogation device, for example as presented above. Such an interrogation device, for example associated with the vehicle, thus makes it possible to select the sensor owing to the polarization direction of the antennas.

The invention claimed is:

1. A ground-contacting component of a vehicle, comprising:
    at least two physical parameter measurement systems, each measurement system having a linearly polarized antenna, the angles of the polarization directions of the antennas together forming a total angle that is between 30 and 90° between the polarization directions of the antennas.

2. The ground-contacting component of a vehicle as claimed in claim 1, wherein said ground-contacting component comprises polymeric compounds, and wherein at least one measurement system is embedded in a polymeric compound.

3. The ground-contacting component of a vehicle as claimed in claim 1, wherein the at least two physical parameter measurement systems are wireless measurement systems based on surface acoustic wave or bulk acoustic wave technology.

4. The ground-contacting component of a vehicle as claimed in claim 1, wherein the at least two physical parameter measurement systems are identical.

5. The ground-contacting component of a vehicle as claimed in claim 1, is a constituent part of a mounted assembly comprising a wheel and a tire, wherein the ground-contacting component is part of the wheel.

6. The ground-contacting component of a vehicle as claimed in claim 1, is a constituent part of a mounted assembly comprising a wheel and a tire, wherein the ground-contacting component is part of the tire.

7. The ground-contacting component of a vehicle as claimed in claim 1, is a constituent part of a mounted assembly comprising a wheel, a tire, and a support member for supporting the tire, wherein the ground-contacting component is part of the support member.

8. A tire, comprising:
- at least one carcass reinforcement structure formed from reinforcing elements and anchored on each side of the tire to a bead, having a base intended to be mounted on a rim seat, each bead being radially outwardly extended by a sidewall, the sidewalls radially outwardly joining a tread, the beads, the sidewalls, and the tread comprising rubber compounds, and
- at least two physical parameter measurement systems, each having linearly polarized antennas, the angles of the polarization directions of the antennas together forming a total angle that is between 30 and 90° between the polarization directions of the antennas.

9. The tire as claimed in claim 8, wherein the at least two physical parameter measurement systems are embedded in at least one rubber compound.

10. The tire as claimed in claim 8, wherein the at least two physical parameter measurement systems are wireless measurement systems based on surface acoustic wave or bulk acoustic wave technology.

11. The tire as claimed in claim 8, wherein the at least two physical parameter measurement systems are identical.

12. The tire as claimed in claim 8, wherein at least one of the at least two physical parameter measurement systems is embedded in a part of the tread.

13. The tire as claimed in claim 8, wherein at least one of the at least two physical parameter measurement systems is embedded in a part of the axially outer ends of the tread.

14. The tire as claimed in claim 8, wherein at least one of the at least two physical parameter measurement systems is embedded in a part of a sidewall.

15. The tire as claimed in claim 8, wherein at least one of the at least two physical parameter measurement systems is embedded in a part of a bead.

16. A vehicle ground contact, comprising:
- at least two elements each comprising at least one physical parameter measurement system, each measurement system having a linearly polarized antenna, the angles of the polarization directions of the antennas together forming a total angle that is between 30 and 90° between the polarization directions of the antennas.

17. The vehicle ground contact as claimed in claim 16, at least one of said two elements consisting partly of polymeric compounds, wherein at least one of the at least two physical parameter measurement systems is embedded in a polymeric compound.

18. The vehicle ground contact as claimed in claim 16, wherein the at least two physical parameter measurement systems are wireless measurement systems based on surface acoustic wave or bulk acoustic wave technology.

19. The vehicle ground contact as claimed in claim 16, wherein the at least two physical parameter measurement systems are identical.

\* \* \* \* \*